(12) United States Patent
Moore et al.

(10) Patent No.: US 8,105,015 B2
(45) Date of Patent: Jan. 31, 2012

(54) METHOD FOR DETERMINING THE TOTAL PRESSURE DISTRIBUTION ACROSS A FAN ENTRY PLANE

(75) Inventors: Barry D Moore, Bristol (GB); Andrew C R Wood, Tintern (GB)

(73) Assignee: Rolls-Royce PLC, London (GB)

( * ) Notice: Subject to any disclaimer, the term of this patent is extended or adjusted under 35 U.S.C. 154(b) by 578 days.

(21) Appl. No.: 12/379,531

(22) Filed: Feb. 24, 2009

(65) Prior Publication Data

US 2009/0246000 A1    Oct. 1, 2009

(30) Foreign Application Priority Data

Apr. 1, 2008   (GB) .................................. 0805832.3

(51) Int. Cl.
*F01B 25/26* (2006.01)
(52) U.S. Cl. .............................. 415/118; 415/17; 416/61
(58) Field of Classification Search .................... 415/17, 415/118
See application file for complete search history.

(56) References Cited

U.S. PATENT DOCUMENTS

2005/0188759 A1   9/2005   Omotani
2009/0169356 A1*  7/2009   Wadia et al. ................... 415/26

FOREIGN PATENT DOCUMENTS

JP    A-2007-279013    10/2007
WO    WO 93/05299 A1   3/1993

\* cited by examiner

*Primary Examiner* — Thao Le
*Assistant Examiner* — Geoffrey Ida
(74) *Attorney, Agent, or Firm* — Oliff & Berridge, PLC

(57) ABSTRACT

A method for determining total pressure distribution across a fan entry plane of a fan situated within a fan casing provided with struts which are positioned upstream of the fan, with respect to the normal air flow direction through the fan. The method comprises the steps of measuring static pressure at first measurement points on the leading edges of at least some of the struts; deriving local angularity values at each measurement point from the respective static pressure measurements; deriving, from the local angularity values, the total pressure loss at first derived points in the fan entry plane which correspond to the first measurement points; measuring static pressure at second measurement points around the intersection between the fan entry plane and the fan casing; deriving, from the static pressure measurements at the second measurement points, the total pressure loss at each second measurement point, and interpolating between total pressure loss values at the first derived points and the second measurement points to determine total pressure distribution across the fan entry plane.

14 Claims, 3 Drawing Sheets

Fig 2

METHOD FOR DETERMINING THE TOTAL PRESSURE DISTRIBUTION ACROSS A FAN ENTRY PLANE

This invention relates to the determination of total pressure distribution across a fan entry plane. In propulsion systems which comprise a rotary fan, it is useful to monitor the total pressure distortion at the inlet to the fan in order to assess the performance of the fan and to provide feedback for control.

Total pressure is usually measured using total pressure probes positioned upstream of the fan. In order to measure total pressure, the probes must be oriented in line with the oncoming flow direction and are usually situated away from neighbouring structures in order to minimize interference with the flow. Deviation from this affects the accuracy of the measurements to the extent that where incidence angles in excess of ±15° are encountered, the probes are rendered ineffective and the readings become invalid.

A particular method for obtaining the total pressure distributions across a fan inlet involves placing a rake of pressure probes upstream of the fan. Each of these probes points directly into the oncoming flow. Measurement obtained from theses probes can thus be used to calculate the distribution of total pressure at the inlet to the fan.

Where a fan forms part of a gas turbine mounted on an aircraft for the provision of forward thrust, the flow entering the fan is substantially aligned with the direction of motion of the aircraft. In such circumstances the direction of the flow is also aligned with the rotational axis of the fan. The probes can thus be positioned forward of the fan such that they are exposed to undisturbed flow and are in line with the flow direction. In these conditions the total pressure probes operate effectively and provide suitable means for measuring the total pressure upstream of the fan.

Where an engine is mounted, for example, so that its longitudinal axis is perpendicular to the longitudinal direction of the aircraft, then during forward flight the incidence of the flow entering the fan inlet will exceed the ±15° operating envelope of total pressure probes configured coaxially with the rotational axis of the fan. Furthermore, where an aircraft is expected to experience a range of flight conditions, such as on a high performance aircraft, the inlet flow angle will fluctuate significantly during flight. Total pressure probes would thus be inadequate for such an application.

A fan located in the main body of an aircraft fuselage would also be susceptible to distortions of the inlet flow as it passes around the aircraft. In the particular circumstance where the fan is disposed behind the cockpit or other flow obstruction, the flow may separate from the surrounding aircraft structure.

Total pressure probes are further limited by the requirement that they must be placed in undisturbed flow. They are therefore unsuitable for use between internal structures of a fan, for example, where guide vanes are disposed upstream of the fan. Furthermore, the presence of total pressure probes in such places would create unwanted disturbances in the flow owing to the wakes generated by the probes.

According to the present invention there is provided a method for determining total pressure distribution across a fan entry plane of a fan situated within a fan casing provided with struts which are positioned upstream of the fan, with respect to the normal air flow direction through the fan, the method comprising the steps of:

measuring static pressure at first measurement points on the leading edges of at least some of the struts;

deriving local angularity values at each measurement point from the respective static pressure measurements;

deriving, from the local angularity values, the total pressure loss at first derived points in the fan entry plane which correspond to the first measurement points;

measuring static pressure at second measurement points around the intersection between the fan entry plane and the fan casing;

deriving, from the static pressure measurements at the second measurement points, the total pressure loss at each second measurement point, and interpolating between total pressure loss values at the first derived points and the second measurement points to determine total pressure distribution across the fan entry plane.

The first measurement points may be provided on the circumference of a circle centred on the rotational axis of the fan. The first measurement points may be situated within a region of the fan annulus which extends radially outwardly over not more than 50% of the distance across the fan annulus. The first measurement points may be spaced from the inner surface of the fan annulus by a distance which is approximately 20% of the distance across the fan annulus and may be located on at least eight of the struts.

Another aspect of the present invention provides a fan situated within a fan casing provided with struts which are positioned upstream of the fan, with respect to the normal air flow direction through the fan, the assembly further comprising:

first static pressure measuring means for measuring static pressure at first measurement points on the leading edges of at least some of the struts;

second static pressure measuring means for measuring static pressure at second measurement points around the intersection between the fan entry plane and the fan casing; and process means adapted to:

derive local angularity values at each measurement point from the respective static pressure measurements;

derive, from the local angularity values, the total pressure loss at points in the fan entry plane which correspond to the first measurement points;

derive, from the static pressure measurements at the second measurement points, the total pressure loss at each second measurement point, and interpolate between total pressure loss values at the first derived points and the second measurement points to determine total pressure distribution across the fan entry plane.

In order for the invention to be more clearly understood, a particular embodiment of the invention will now be described, by way of example, with reference to the following drawings, in which.

Figure 1:
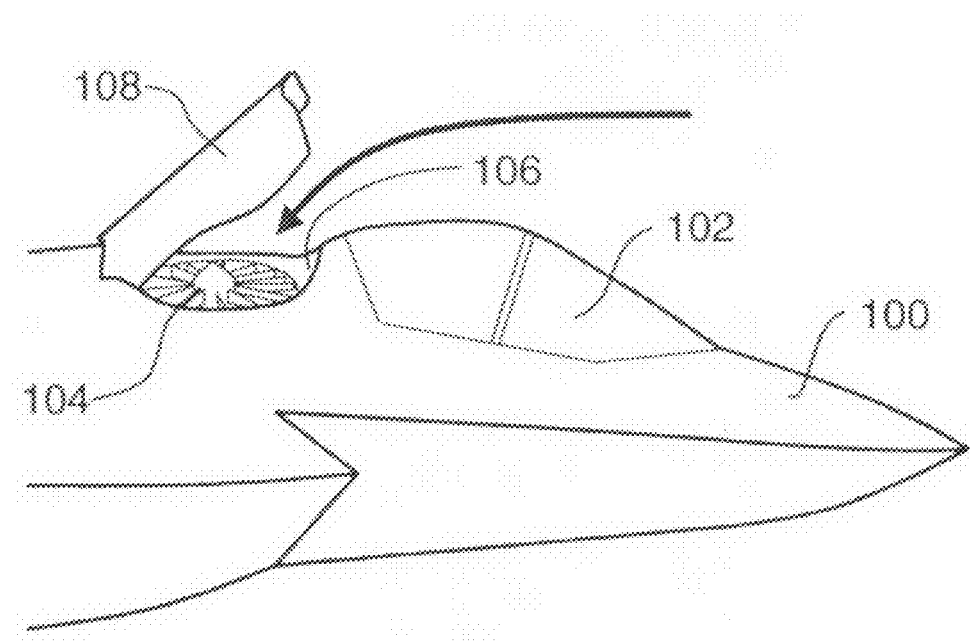
FIG. 1 shows the forward end of an aircraft provided with a lift fan.

The aircraft shown in FIG. 1 comprises a fuselage 100 provided with a cockpit 102 which projects into the airflow over the main surface of the fuselage 100. A lift fan 104 is situated aft of the cockpit 102, in a duct 106 which extends between the top and bottom surfaces of the fuselage 100. An aft-hinged door 108 is movable from an open position shown in FIG. 1 to a closed position in which it covers the entry to the duct 106 to provide a streamlined contour over the fuselage 100.

Figure 2:
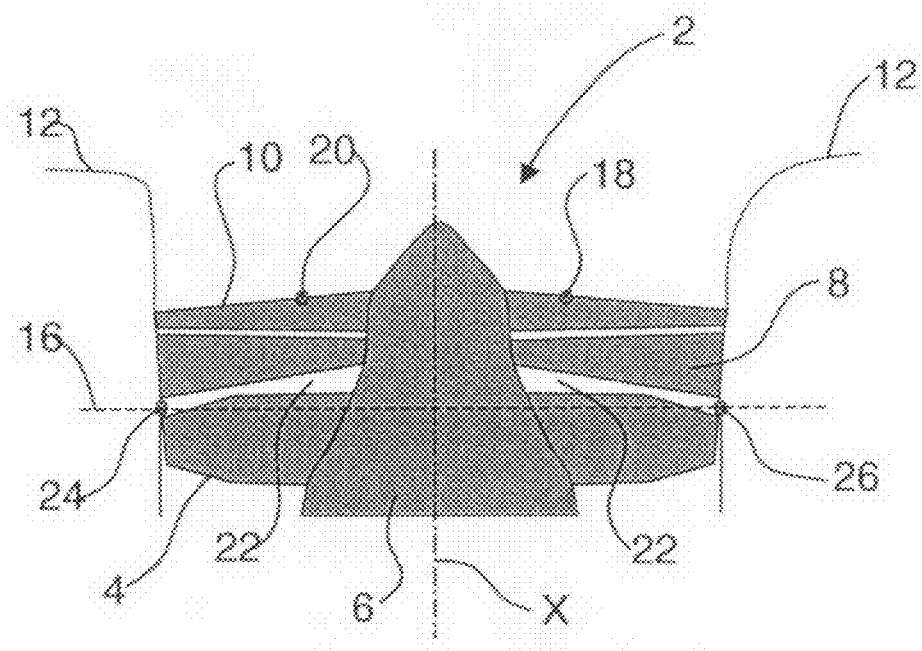
FIG. 2 is a sectional view of the fan.

FIG. 2 shows the lift fan 104, which is part of a fan assembly 2 also comprising a nose section 6, a plurality of inlet guide vanes 8 and a plurality of struts 10. The fan 4 has an axis of rotation X which is substantially upright but, in alternative embodiments, may be inclined or horizontal. An annular fan casing 12 surrounds the fan assembly 2 to define the duct 106 having an inlet upstream of the fan 4.

The inlet guide vanes 8 are positioned upstream of the fan 4 and extend radially inwardly from the fan casing 12. The fan comprises an array of fan blades 4 which extend radially outward from the rotational axis X of the fan 4 towards the fan casing 12. The tip of each fan blade 4 lies radially inward of the fan casing 12 thereby creating a space between the blade tip and the fan casing 12. The fan casing 12 has rounded edges upstream of the fan 4 to provide improved flow conditions for the inlet flow. The struts 10 are positioned upstream of the fan 4 and the inlet guide vanes 8, and extend radially outward from the axis of rotation X of the fan 4 and adjoin with the fan casing 12.

A fan entry plane 16 is shown in FIG. 2 on the upstream side of the fan 4, between the fan 4 and the inlet guide vanes 8. The fan entry plane 16 is perpendicular to the axis of rotation X of the fan 4.

At least some, and possibly all, of the struts 10 shown in FIG. 2 are provided with static pressure probes 18, disposed at a first set of measurement points 20 on the leading edges of the struts 10, for determining the static pressure at the leading edges of the struts 10. It will be appreciated that different numbers of probes 18 may be used, depending on circumstances and the accuracy of output required. In a specific embodiment, eleven probes 18 are employed.

Figure 3:
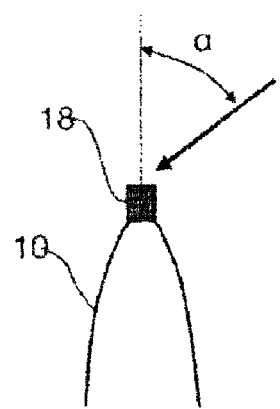
FIG. 3 shows a static pressure measuring head located on a strut upstream of the lift fan.

FIG. 3 shows, in diagrammatic form, one of the static pressure probes 18 positioned on the leading edge of a respective strut 10. The static pressure probes 18 are situated at a distance of approximately 20% of the annular span of the fan casing 12 from the surface of the nose section 6, as shown in FIG. 2.

The fan casing 12 is provided with further static pressure probes 24 for determining the static pressure of the flow at a second set of measurement points 26 located around the intersection between the fan entry plane 16 and the fan casing 12. It will be appreciated that different numbers of probes 24 may be used, depending on circumstances and the accuracy of output required. In a specific embodiment, sixty-six probes 24 are employed.

Because the probes 18 and 24 are static pressure probes, they need to be oriented so that they are perpendicular to the measured flow. This is accomplished by locating them within the wall surface of the respective strut 10 or casing 12 that the flow washes over.

In operation, air is drawn into the inlet provided by the fan casing 12, and through the fan assembly 2. Flow entering the fan assembly 2 will thus flow between the struts 10 and the inlet guide vanes 8. The flow then passes between the fan blades 4 and exhausts downstream of the fan 4. As the flow passes through the fan assembly 2, the flow will experience losses in pressure, with respect to the free-stream total pressure, as a result of interactions with components of the fan assembly 2. Additional losses in total pressure will occur due to interaction of the flow with structures that are in proximity with the fan assembly inlet such as the cockpit 102 and the aft-hinged door 108.

For instance, flow would separate from the fan casing 12 at the inlet in certain flight conditions. These separations create pressure losses in the flow that is subsequently drawn through the fan assembly 2. Computational Fluid Dynamics (CFD) shows that such losses have most effect in the outer 25% of the fan annulus, ie at positions that are more than 75% of the distance from the inner surface of the annulus (defined by the nose section 6) to the outer surface of the annulus (defined by the casing 12). The variation in total pressure around the fan axis X is greatest at the casing 12.

Losses in total pressure also occur when the flow passes over the struts 10 at high angles of incidence. These high angles of incidence are generally a consequence of the forward flight of the aircraft. The flow incidence angle at the leading edge of each strut 10 is called the local angularity $\alpha$. The local angularity $\alpha$ is measured with respect to the fan axis X, in a plane which is perpendicular to the length of the strut 10 and contains the fan axis X. The greater the local angularity $\alpha$, the more likely the flow is to separate as it passes over the strut 10. CFD analysis shows that the losses in total pressure caused by separation of the flow over the strut 10 are most dominant in the inner 50% of the fan annulus (ie at positions that are less than half of the way across the annulus). In the embodiment shown in FIG. 2, the static pressure probes 18 are situated approximately 20% of the span of the fan annulus from the inner surface of the annulus, on a circle centred on the fan axis X.

Figure 4:
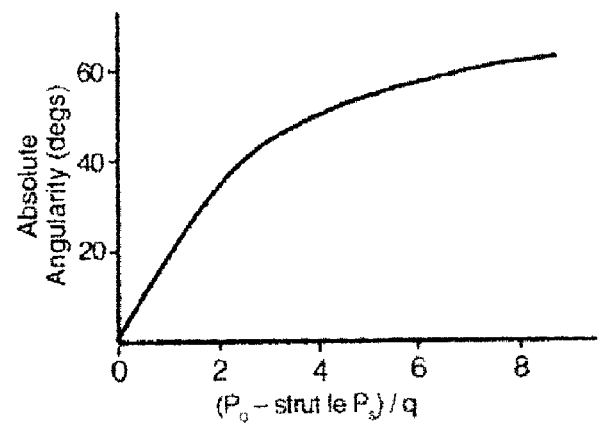
FIG. 4 is a graph showing local flow angularity as a function of strut leading edge pressure measurements.

Experimental data or data obtained from CFD or other simulation models, may be used to determine the relationship between the static pressure and the local angularity $\alpha$ at the leading edges of the struts 10. An example of results obtained is shown in FIG. 4, which illustrates the relationship between static pressure $P_s$ and local angularity $\alpha$ at the leading edge of the struts 10. The relationship is given in terms of the difference between free-stream total pressure $P_0$ and the static pressure $P_s$, normalised with respect to dynamic head, q.

Once this relationship has been identified for a particular set of flow conditions, it is possible to derive the local angularity $\alpha$ at the first set of measurement points 20 at the leading edge of the struts 10 using static pressure measurements made at these same points.

Figure 5:
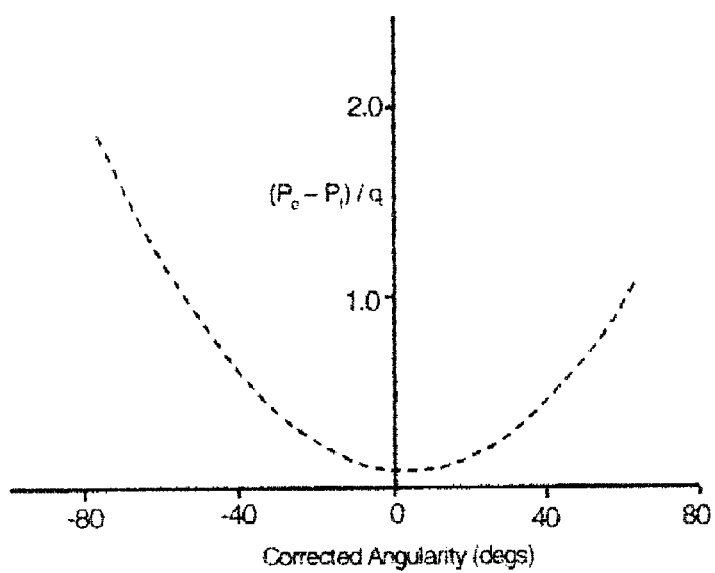
FIG. 5 is a graph showing pressure loss as a function of local flow angularity.

The separation of the flow over the struts 10 leads to a loss in total pressure at the fan entry plane 16. The total pressure loss at the fan entry plane 16 is directly related to the local angularity a of the flow at the leading edges of the struts 10. Results obtained from a simulation model are shown in FIG. 5, and illustrate the relationship between loss in total pressure and local angularity $\alpha$ at the leading edge of a strut 10. The relationship is given in terms of the difference between free-stream total pressure $P_0$ and the total pressure $P_f$, normalised with respect to dynamic head, q.

Once this relationship has been identified for a particular set of flow conditions, it is possible to derive the loss in total pressure at a first set of derived points 22 in the fan entry plane 16 using the derived values for local angularity $\alpha$.

Static pressure values taken at the first measurement points 20 can thus be used to find the total pressure loss at the first derived points 22 on the fan entry plane 16.

Figure 6:
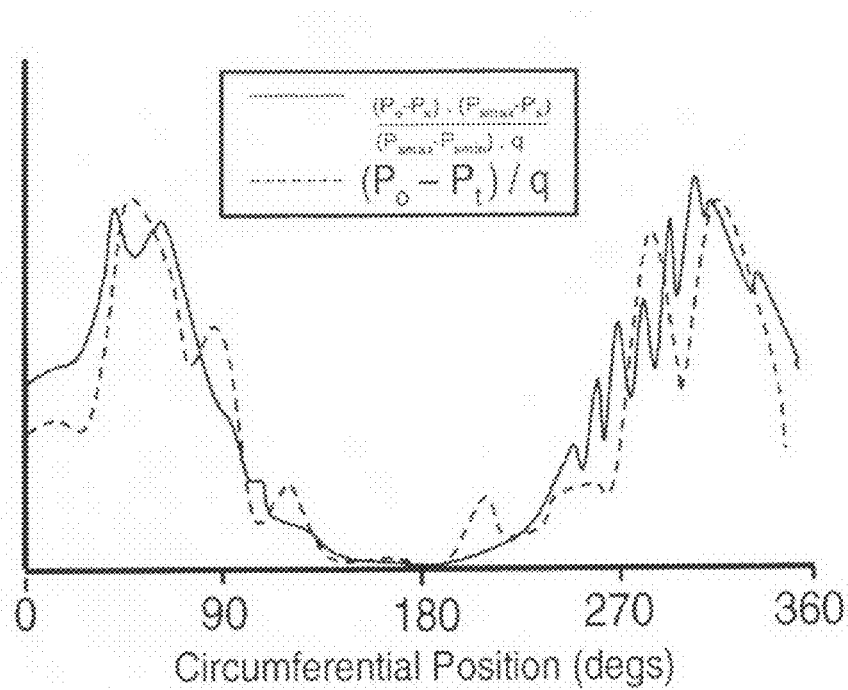
FIG. 6 is a graph showing pressure variation at the fan entry plane at the outer casing radius.

Experimental analysis or CFD or other simulation models may be used to determine the relationship between the static pressure and the total pressure at the intersection between the fan entry plane 16 and the fan casing 12. FIG. 6 shows a relationship between static pressure and total pressure at the second measurement points 26 obtained from a simulation model. The difference between free-stream total pressure and static pressure $(P_0-P_s)$ multiplied by $(P_{smax}-P_s)/(P_{smax}-P_{smin})$ where $P_{smax}$ and $P_{smin}$ are the maximum and minimum static pressure measurements around the annulus, at the second measurement 26 points correlates with the difference between free-stream total pressure and total pressure at the second measurement points 26 ($P_0 - P_t$) when both are normalised by dynamic head, q.

Once this relationship has been identified for a particular set of flow conditions, it is possible to derive the total pressure at the second set of measurement points 26 using static pressure measurements made at the second measurement points 26.

Figure 7:
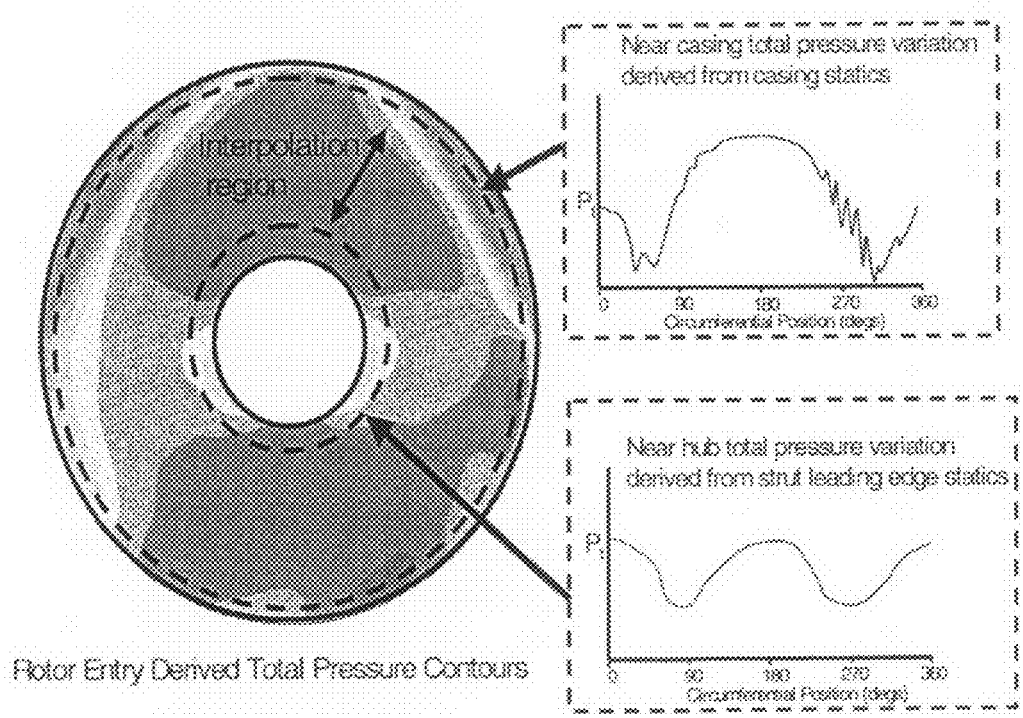
FIG. 7 is a diagram illustrating total pressure variation at the fan entry plane.

FIG. 7 shows the radial positions of the first derived points 22 and the second measurement points 26 when the fan entry plane 16 is viewed along the fan axis X. It can be seen that first derived points 22 are positioned radially inward of the second measurement points 26. Plots illustrating the derived total pressure distributions for each set of measurement points 20,26 are also shown in FIG. 7.

Using an appropriate interpolation process, it is possible to derive values for total pressure at various points in the fan entry plane 16 between the first derived points 22 and the second measurement points 26 to determine the total pressure distribution across the fan entry plane 16.

It will be appreciated that, in a practical embodiment of the invention, processing means will be provided onboard the aircraft for receiving inputs from the static pressure probes 18 and 24, for performing the necessary calculations to determine the total pressure distribution, and for providing outputs for the purpose of displaying information relating to the operation of the fan, and for the purpose of controlling the fan.

The invention claimed is:

1. A method for determining total pressure distribution across a fan entry plane of a fan situated within a fan casing provided with struts which are positioned upstream of the fan, with respect to the normal air flow direction through the fan, the method comprising the steps of:
   measuring static pressure at first measurement points on the leading edges of at least some of the struts;
   deriving local angularity ($\alpha$) values at each measurement point from the respective static pressure measurements;
   deriving, from the local angularity ($\alpha$) values, the total pressure loss at first derived points in the fan entry plane which correspond to the first measurement points;
   measuring static pressure at second measurement points around the intersection between the fan entry plane and the fan casing;
   deriving, from the static pressure measurements at the second measurement points, the total pressure loss at each second measurement point, and
   interpolating between total pressure loss values at the first derived points and the second measurement points to determine total pressure distribution across the fan entry plane.

2. A method as claimed in claim 1, characterised in that the first measurement points are provided on the circumference of a circle centred on the rotational axis (X) of the fan.

3. A method as claimed in claim 1, characterised in that the first measurement points are situated within a region of the fan annulus which extends radially outwardly over not more than 50% of the distance across the fan annulus.

4. A method as claimed in claim 3, characterised in that the first measurement points are spaced from the inner surface of the fan annulus by a distance which is approximately 20% of the distance across the fan annulus.

5. A method as claimed in claim 1, characterised in that the first measurement points are located on at least eight of the struts.

6. A method as claimed in claim 1, characterised in that there are at least fifty of the second measurement points.

7. A method as claimed in claim 1, characterised in that the fan is a lift fan of an aircraft.

8. A fan assembly comprising a fan situated within a fan casing provided with struts which are positioned upstream of the fan, with respect to the normal air flow direction through the fan, the assembly further comprising:
   first static pressure measuring means for measuring static pressure at first measurement points on the leading edges of at least some of the struts;
   second static pressure measuring means for measuring static pressure at second measurement points around the intersection between the fan entry plane and the fan casing; and
   process means adapted to:
   derive local angularity ($\alpha$) values at each first measurement point from the respective static pressure measurements;
   derive, from the local angularity ($\alpha$) values, the total pressure loss at first derived points in the fan entry plane which correspond to the first measurement points;
   derive, from the static pressure measurements at the second measurement points, the total pressure loss at each second measurement point, and
   interpolate between total pressure loss values at the first derived points and the second measurement points to determine total pressure distribution across the fan entry plane.

9. A fan assembly as claimed in claim 8, characterised in that the first measurement points are provided on the circumference of a circle centred on the rotational axis (X) of the fan.

10. A fan assembly as claimed in claim 8, characterised in that the first measurement points are situated within a region of the fan annulus which extends radially outwardly over not more than 50% of the distance across the fan annulus.

11. A fan assembly as claimed in claim 10, characterised in that the first measurement points are spaced from the inner surface of the fan annulus by a distance which is approximately 20% of the distance across the fan annulus.

12. A fan assembly as claimed in claim 8, characterised in that the first measurement points are located on at least eight of the struts.

13. A fan assembly as claimed in claim 8, characterised in that there are at least fifty of the second measurement points.

14. An aircraft provided with a fan assembly in accordance with claim 8.

* * * * *